Patented Jan. 28, 1936

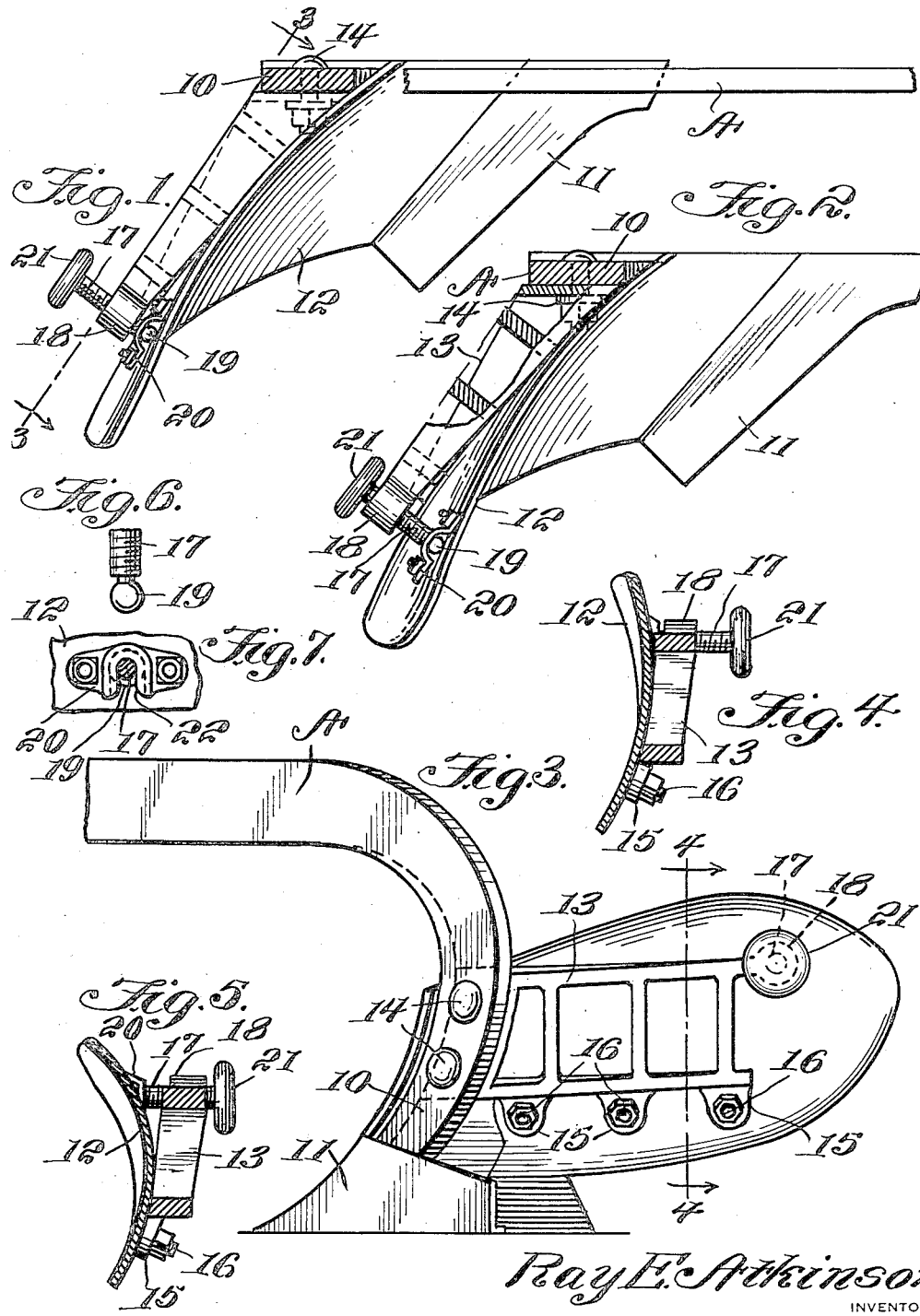

2,028,819

UNITED STATES PATENT OFFICE 2,028,819

BREAKING PLOW

Ray E. Atkinson, Fowler, Ind.

Application April 10, 1935, Serial No. 15,688

2 Claims. (Cl. 97—124)

The invention relates to a breaking plow and more especially to an adjustable mouldboard for plows.

The primary object of the invention is the provision of a mouldboard of this character, wherein the same can be adjusted accordingly to the requirements in the use thereof upon a plow, the means for adjusting the mouldboard being of novel form and such mouldboard of a springy flexible nature.

Another object of the invention is the provision of a mouldboard of this character, which is simple in construction, thoroughly reliable and efficient in its operation, readily and easily adjusted, susceptible of use on varying types of plows, particularly the breaking plows, strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a top plan view partly in section of a plow showing the mouldboard constructed in accordance with the invention associated therewith.

Figure 2 is a fragmentary view similar to Figure 1 showing the mouldboard adjusted.

Figure 3 is a fragmentary sectional view on the line 3—3 of Figure 1 looking in the direction of the arrows.

Figure 4 is a sectional view on the line 4—4 of Figure 3 looking in the direction of the arrows.

Figure 5 is a view similar to Figure 4 showing adjustment of the mouldboard.

Figure 6 is a fragmentary elevation of the adjusting screw.

Figure 7 is a detailed elevation of the coupling for said screw.

Similar reference characters indicate corresponding parts throughout the several views in the drawing.

Referring to the drawing in detail, A designates generally a plow beam, its leg 10 supporting a conventional plow point 11 and to this leg is connected the adjustable mouldboard hereinafter fully described and constituting the present invention.

The mouldboard 12 is carried upon a strut 13 of frame form which at the forward end thereof is bolted or otherwise at 14 made fast to the leg 10 and the lower portion of this strut is formed with spaced attaching ears 15, these receiving fasteners 16 which secure the mouldboard 12 at the line of the ears 15.

The strut 13 at the end rearmost thereof and at the uppermost portion carries an adjusting screw 17 suitably threaded in the bearing 18 therefor and this screw is formed with a ball terminal 19 which loosely fits within a coupling piece 20 made secure to the mouldboard in alignment with said screw. The screw is provided with a turning head 21 and it should be apparent that on adjustment of the screw 18 the mouldboard 12 can be flexed in that it is of springy flexible material. Thus the mouldboard can be adjusted to satisfy the required circumstances in the use of the plow.

The coupling 20 is formed with a slot 22 for the detachable connection of the ball terminal 19 of the screw 17 with said coupling.

What is claimed is:

1. An adjustable mouldboard, comprising a strut for fixed engagement to a leg of a plow beam, a springy mouldboard section carried by the strut and connected therewith at the lower portion of said section, and means on the strut and active upon the mouldboard section to flex the same.

2. An adjustable mouldboard, comprising a strut for fixed engagement to a leg of a plow beam, a springy mouldboard section carried by the strut and connected therewith at the lower portion of said section, and an adjustable screw fitted with the strut and coupled with the mouldboard section for adjustably flexing the latter.

RAY E. ATKINSON.